United States Patent [19]

Dobberstein et al.

[11] Patent Number: 4,612,942

[45] Date of Patent: Sep. 23, 1986

[54] FLAVOR ENHANCING AND MODIFYING MATERIALS

[75] Inventors: Robert H. Dobberstein, Wheaton; Fred K. Suzuki, Arlington Heights, both of Ill.

[73] Assignee: Stevia Company, Inc., Arlington Heights, Ill.

[21] Appl. No.: 587,599

[22] Filed: Mar. 8, 1984

[51] Int. Cl.$^4$ .................. A24B 3/12; A24B 15/34
[52] U.S. Cl. .................... 131/276; 426/548; 536/18.1
[58] Field of Search .............. 426/548; 131/276; 536/18.1

[56] References Cited

U.S. PATENT DOCUMENTS

| | | | |
|---|---|---|---|
| 2,766,145 | 10/1956 | Jones | 131/276 |
| 2,766,148 | 10/1956 | Rowland | 131/276 |
| 3,344,796 | 10/1967 | Yamaji et al. | 131/276 |
| 4,361,697 | 11/1982 | Dobberstein et al. | 536/128 |
| 4,402,990 | 9/1983 | DuBois | 536/18.1 |
| 4,404,367 | 9/1983 | Stephenson et al. | 536/18.1 |
| 4,454,290 | 6/1984 | DuBois | 426/548 |

*Primary Examiner*—Y. Harris-Smith
*Attorney, Agent, or Firm*—Tom F. Pruitt

[57] ABSTRACT

Diterpene glycosides have been found to enhance and modify the flavor of orally consumable compositions, such as foodstuffs, smoking compositions, chewing compositions, oral hygiene compositions and medicinal compositions to improve or vary the sensory perceptions thereof. An orally consumable composition having an enhanced or modified flavor comprises an effective amount of a diterpene glycoside. A diterpene glycoside can be added to an orally consumable composition as a constituent of the leaf material of *Stevia rebaudiana*. One or more compounds which are not diterpene glycosides, which contribute an unpleasant or unsweet taste to the leaf material of *Stevia rebaudiana*, can be removed from the leaf material by heating the leaf material at a temperature in the range of about 60° C. to about 200° C. or by extraction with an organic solvent having a polarity greater than hexane but less than water.

36 Claims, No Drawings

FLAVOR ENHANCING AND MODIFYING MATERIALS

BACKGROUND OF THE INVENTION

This invention relates to diterpene glycosides having the structure:

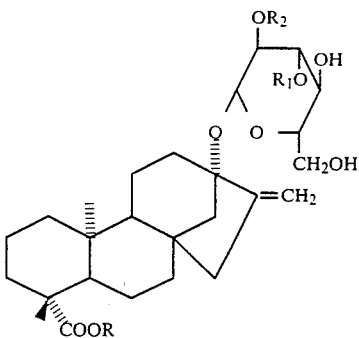

wherein R, $R_1$ and $R_2$ are selected from the group consisting of H, glucose, rhamnose or beta-sophorose. These diterpene glycosides can be selected from the group consisting of steviolbioside ($R=R_1=H$; $R_2=$glucose); stevioside ($R=R_2=$glucose; $R_1=H$); rebaudioside A ($R=R_1=R_2=$glucose); rebaudioside B ($R=H$; $R_1=R_2=$glucose); rebaudioside C ($R=R_1=$glucose; $R_2=$rhamnose); rebaudioside D ($R=$beta-sophorose; $R_1=R_2=$glucose); rebaudioside E ($R=$beta-sophorose; $R_1=H$; $R_2=$glucose); dulcoside A ($R=$glucose; $R_1=H$; $R_2=$rhamnose); steviolmonoside ($R=R_1=R_2=H$); and rubusoside ($R=$glucose; $R_1=R_2=H$); and derivatives of such compounds. In one aspect, this invention relates to a process for enhancing or modifying the flavor of an orally consumable composition by adding thereto a small but effective amount of a diterpene glycoside. In another aspect, this invention relates to a novel orally consumable composition having a modified or enhanced flavor comprising a small but effective amount of a diterpene glycoside.

By the term "orally consumable composition", as used herein, is meant substances which are contacted with the mouth of man or animal, including substances which are taken into and subsequently ejected from the mouth and substances which are drunk, eaten, swallowed or otherwise ingested. There is a need for materials which can modify or enhance the flavor of orally consumable compositions such as foodstuffs, smoking compositions, chewing compositions, oral hygiene compositions and medicinal compositions to improve or vary the sensory perceptions thereof.

In the art of flavoring foodstuffs and medicinal compositions, there is a continuing need for compositions which can modify and improve the flavor of such materials, because acceptance and demand for foodstuffs and medicinal products is generally related to the sensory perception of them. In the art of flavoring oral hygiene compositions, such as mouthwash and toothpaste, and in the art of flavoring chewing compositions, such as chewing tobacco, snuffs and chewing gum, there is a need to improve the flavor characteristics of such chewing compositions with flavor modifiers or enhancers which are non-cariogenic and do not support the growth of tooth decay producing streptococci, lactobaccilli, or the like. In the art of flavoring smoking compositions, considerable emphasis has been placed on the development of improved flavors for low delivery smoking compositions. Low delivery smoking products generally produce 15 mg or less of tar. Tar is generally defined as the total particulate matter collected on a standard filter, minus the nicotine and water content. Smoking designs accomplishing low delivery, such as ventilated filters, often cause air dilution of the flavorants in the smoke. This dilution reduces the flavor and desirability of the smoking composition. There is a need for materials to enhance or modify flavors of low delivery and other smoking compositions.

THE INVENTION

It is an object of this invention to provide an orally consumable composition having a modified or enhanced flavor. Another object of this invention is to provide a process for modifying or enhancing the flavor of an orally consumable composition, and additionally, another object of this invention is to provide a process for modifying or enhancing the taste, aroma and/or texture of foodstuffs, smoking compositions, chewing compositions, oral hygiene compositions and medicinal compositions.

These and other objects, advantages, details, features and embodiments of this invention will become apparent to those skilled in the art from the following detailed description of the invention and the appended claims.

Diterpene glycosides of this invention have the structure:

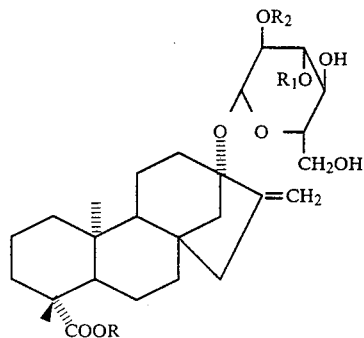

wherein R, $R_1$ and $R_2$ are selected from the group consisting of H, glucose, rhamnose or beta-sophorose.

These diterpene glycosides can be selected from the group consisting of steviolbioside ($R=R_1=H$; $R_2=$glucose); stevioside ($R=R_2=$glucose; $R_1=H$); rebaudioside A ($R=R_1=R_2=$glucose); rebaudioside B ($R=H$; $R_1=R_2=$glucose); rebaudioside C ($R=R_1=$glucose; $R_2=$rhamnose); rebaudioside D ($R=$betasophorose; $R_1=R_2=$glucose); rebaudioside E ($R=$beta-sophorose; $R_1=H$; $R_2=$glucose); dulcoside A ($R=$glucose; $R_1=H$; $R_2=$rhamnose); steviolmonoside ($R=R_1=R_2=H$); and rubusoside ($R=$glucose; $R_1=R_2=H$); and derivatives of such compounds.

This invention is based on the discovery that diterpene glycosides, having the structure shown above, have unexpected and advantageous flavor enhancement and modification properties.

The leaves of *Stevia rebaudiana* Bert. (Composite), herein referred to as *S. rebaudiana*, are known to be sweet tasting and to have sweet tasting constituents. Efforts have been made to recover and separate the sweetest components of the leaves of *S. rebaudiana* for commercial use as sweeteners. U.S. Pat. No. 3,723,410 and U.S. Pat. No. 4,082,858 describe separation and isolation of two sweet tasting compounds from the leaves of *S. rebaudiana:* stevioside and rebaudioside A, respectively. U.S. Pat. No. 4,361,697 describes a process for the extraction, separation and recovery of eight of the above described structurally related sweet diterpene glycosides from the leaves of *S. rebaudiana.* Steviolmonoside and rubusoside are not obtained as extractives from *S. rebaudiana.*

In this invention, it has been discovered that a diterpene glycoside can modify or enhance the flavor of an orally consumable composition. It has been found that an orally consumable composition having a modified or enhanced flavor comprises a diterpene glycoside at a concentration substantially below the sweetness detection threshold level of such diterpene glycoside in the orally consumable compositions. The exact mechanism of the flavor modification or enhancement by the diterpene glycoside is not known.

The term "flavor" or "flavor characteristic", as used herein, is the combined sensory perception of the components of taste, odor and/or texture. The term "enhance", as used herein, includes augmenting, intensifying, accentuating, magnifying and potentiating the sensory perception of a flavor characteristic without changing the nature or quality thereof. The term "modify", as used herein, includes altering, varying, suppressing, depressing, fortifying and supplementing the sensory perception of a flavor characteristic where the quality or duration of such characteristic was deficient.

The term "orally consumable composition" includes foodstuffs, medicinal compositions, smoking compositions, chewing compositions and oral hygiene compositions, including mouthwashes and toothpastes. The term "foodstuff" includes both solid and liquid ingestable materials which usually do, but need not, have a nutritional value and are intended for consumption by man or animal. Representative examples of foodstuff include coffee, teas, herbal teas, baked goods, natural and synthetic flavors, spices, condiments, soups, stews, convenience foods, beverages (both carbonated and non-carbonated), dairy products, candies, vegetables, cereals, fruits, fruit drinks, snacks, cocoa products, chocolates, animal feed, and the like. The term "medicinal composition" includes solids, gases and liquids which are ingestable materials having medicinal value, such as cough syrups, cough drops, medicinal sprays, vitamins and chewable medicinal tablets. The term "chewing compositions" include chewing tobacco, smokeless tobacco, snuff, chewing gum and other compositions which are masticated and subsequently expectorated. Chewing gum includes compositions which comprise a substantially water-insoluble, chewable gum base, such as chicle or substitutes therefor, including jetulong, guttakay rubber or certain comesible natural synthetic resins or waxes. The term "oral hygiene compositions" includes mouthwashes, mouthrinses, toothpastes, tooth polishes, dentrifices, mouth sprays and mouth refreshers. The term "smoking composition", as used herein, includes cigarette, pipe and cigar tobacco, and all forms of tobacco such as shredded filler, leaf, stem, stalk, homogenized leaf cured, reconstituted binders and reconstituted tobacco from tobacco dust, fines or other sources in sheet, pellet or other forms. "Smoking compositions" also include tobacco substitutes formulated from non-tobacco materials, such as representative tobacco substitutes described in U.S. Pat. Nos. 3,529,602, 3,703,177 and 4,079,742 and references cited therein.

In accordance with a first embodiment of this invention, an orally consumable composition having an enhanced or modified flavor is provided.

It has been discovered that a diterpene glycoside can modify or enhance flavor characteristics which are sweet, fruity, floral, herbaceous, spicy, aromatic or pungent. A diterpene glycoside is particularly effective in modifying or enhancing "nut-like" flavors, such as almond, pecan, and the like; "spicy" flavors, such as cinnamon, clove, nutmeg, anise and wintergreen; "non-citrus fruit" flavors, such as strawberry, cherry, apple, grape, currant, tomato, gooseberry and blackberry; "citrus fruit" flavors, such as orange, lemon and grapefruit; and other useful flavors, including coffee, cocoa, peppermint, spearmint, vanilla and maple.

An orally consumable composition comprising an effective amount of a diterpene glycoside having the structure shown above has an enhanced or modified flavor. A diterpene glycoside can modify or enhance the flavor of a foodstuff, a medicinal composition, a chewing composition and a smoking composition. The orally consumable composition preferably comprises a diterpene glycoside selected from the group consisting of steviolbioside ($R=R_1=H$; $R_2=$glucose); stevioside ($R=R_2=$glucose; $R_1=H$); rebaudioside A ($R=R_1=R_2=$glucose); rebaudioside B ($R=H$; $R_1=R_2=$glucose); rebaudioside C ($R=R_1=$glucose; $R_2=$rhamnose); rebaudioside D ($R=$beta-sophorose; $R_1=R_2=$glucose); rebaudioside E ($R=$beta-sophorose; $R_1=H$; $R_2=$glucose); dulcoside A ($R=$glucose; $R_1=H$; $R_2=$rhamnose); steviolmonoside ($R=R_1=R_2=H$); and rubusoside ($R=$glucose; $R_1=R_2=H$); and derivatives of such compounds.

In accordance with one variation of this embodiment, an orally consumable composition comprises a diterpene glycoside in an amount effective to modify or enhance the taste, odor and/or texture of the orally consumable composition, wherein said amount of diterpene glycoside added is less than the sweetness threshold level of the diterpene glycoside in the orally consumable composition. The sweetness threshold level is a concentration of a diterpene glycoside in an orally consumable composition at which the sweetness of the diterpene glycoside is perceptible.

The terminology "amount effective" or "effective amount" is to be given significance in the context of the present invention. The use of an insufficient amount of a diterpene glycoside, less than the effective amounts, will not produce an effective sensory perception. The use of an excessive amount of a diterpene glycoside will produce sweetness which may not be desired for flavor modification or enhancement. The amount of a diterpene glycoside which this invention employed can vary over a relatively wide range, depending upon the desired sensory effect to be achieved with the orally consumable composition and the nature of the initial composition. The sweetness threshold level at which the sweetness of a diterpene glycoside will become perceptible is also not an absolute, but is affected by the presence of other materials and stimuli.

In accordance with a preferred variation of this embodiment, an orally consumable composition having a modified or enhanced flavor comprises 0.001 to 0.03 parts by weight of a diterpene glycoside to 100 parts by weight of an orally consumable composition. In accordance with the more preferred variation of this embodiment of this invention, 0.004 to 0.015 parts by weight of a diterpene glycoside is added to 100 parts by weight of an orally consumable composition.

In accordance with another variation of this embodiment, it has been found that an orally consumable composition can have an enhanced or modified flavor by having added thereto leaf material of S. rebaudiana which comprises a diterpene glycoside. It is surprising that the leaves of S. rebaudiana may be used as a flavor enhancer or modifier, since the leaves may comprise tannins, flavinoids, aromatic or essential oils and other naturally occurring compounds which may lend a bitter or off-taste when the leaves of S. rebaudiana are used at or above the sweetness threshold. It is preferred to add the leaf material of S. rebaudiana to an orally consumable composition at a level wherein the total presence of the level of diterpene glycoside in the leaf material, as added to the orally consumable composition, is in the range of about 0.001 to about 0.03 parts by weight diterpene glycoside from the leaf material to 100 parts by weight orally consumable composition. It is more preferable to add 0.004 to about 0.015 parts by weight diterpene glycoside from the leaf material to 100 parts by weight orally consumable composition.

Diterpene glycosides, as described herein, represent a new class or genus of flavor modifiers or enhancers. Other flavorants, flavor modifiers or enhancers known in the art include (i) organic acids, their salts and their esters, including adipic acid, fumaric acid, lactic acid, succinic acid, tartaric acid and ethyl formate; (ii) amino acids and their salts, including glycine, cysteine and glutamic acid; (iii) protein hydrolysates; (iv) ribotides, including disodium 5' inosinate and disodium 5" guanylate; (v) inorganic salts, such as sodium chloride and potassium chloride; (vi) pyrones, such as maltol and ethyl maltol; and (vii) other modifiers and enhancers known in the art.

In accordance with another embodiment of this invention, a process for modifying or enhancing the flavor of orally consumable compositions comprises the step of adding to the orally consumable composition an effective amount of a diterpene glycoside. The orally consumable composition can be selected from the group consisting of a foodstuff, a medicinal composition, an oral hygiene composition, a chewing composition and a smoking composition. Preferably, the diterpene glycoside added to the orally consumable composition is, referring to structure shown above, selected from the group consisting of steviolbioside ($R=R_1=H$; $R_2=$glucose); stevioside ($R=R_2=$glucose; $R_1=H$); rebaudioside A ($R=R_1=R_2=$glucose); rebaudioside B ($R=H$; $R_1=R_2=$glucose); rebaudioside C ($R=R_1=$glucose; $R_2=$rhamnose); rebaudioside D ($R=$beta-sophorose; $R_1=R_2=$glucose); rebaudioside E ($R=$beta-sophorose; $R_1=H$; $R_2=$glucose); dulcoside A ($R=$glucose; $R_1=H$; $R_2=$rhamnose); steviolmonoside ($R=R_1=R_2=H$); and rubusoside ($R=$glucose; $R_1=R_2=H$); and derivatives of such compounds. In one variation of this embodiment, a leaf material of S. rebaudiana comprising a diterpene glycoside can be added in accordance with the process for modifying or enhancing the flavor of an orally consumable composition.

A diterpene glycoside can be added to an orally consumable composition by admixing the diterpene glycoside with the orally consumable composition or admixing the diterpene glycoside with a component of the orally consumable composition.

In accordance with another embodiment of this invention, it has been discovered that a diterpene glycoside can modify or enhance the flavor of a smoking composition. It has been found that a smoking composition having an enhanced or modified flavor comprises a smoking filler material selected from the group consisting of tobacco, reconstituted tobacco, non-tobacco substitutes and mixtures thereof, and an effective amount of a diterpene glycoside. In one variation of this embodiment, the smoking composition comprises a filter means comprising a diterpene glycoside. The term "filter means", as used herein, includes a smoking device means such as a cigar or cigarette holder having a filtering or flavoring module incorporated therein and includes acetate, cotton, charcoal and other fiber, flake or particle filtering means. In another variation of this embodiment, the smoking composition comprises a wrapper means comprising a diterpene glycoside. In one variation of this embodiment of this invention, 0.003 to 0.30 parts by weight of a diterpene glycoside is added to 100 parts by weight of the smoking filler material. In a preferred variation of this embodiment of this invention, 0.015 to 0.30 parts by weight of a diterpene glycoside is added to 100 parts of a weight of a smoking filler material.

Those skilled in the art of flavoring tobacco understand that the effective amount of the diterpene glycoside added to a smoking composition may depend upon the method in which the diterpene glycoside is added to the smoking composition and to which portion of the smoking composition the diterpene glycoside is added. The diterpene glycoside can be added directly to the smoking filler material, to the filter means or to the wrapper means of a smoking composition. A diterpene glycoside can be added to a filter means of a smoking composition by any manner known to those skilled in the art of flavoring filter means, including but not limited to, incorporating the diterpene glycoside among the fibers, flakes or particles of a filter means, filling the diterpene glycoside between two or more layers of fibers of a fiber filber means to form a triple filter means, or inserting the diterpene glycoside into a smoking device means, such as a cigarette holder.

In accordance with another embodiment of this invention, a process for modifying or enhancing the flavor of a smoking composition comprising a smoking filler material selected from the group consisting of tobacco, reconstituted tobacco, non-tobacco substitutes, and mixtures thereof, comprises a step of adding to the smoking composition an effective amount of a diterpene glycoside. In a preferred variation of this embodiment, 0.003 to 0.30 parts by weight of a diterpene glycoside are added to one hundred parts by weight of a smoking filler material. In a more preferred variation of this embodiment, 0.015 to 0.30 parts by weight of a diterpene glycoside are added to one hundred parts by weight of a smoking filler material. A diterpene glycoside may be added to a smoking composition by any methods known in the art. The diterpene glycoside may be added directly to a smoking filler material or filter means, or may be dissolved or suspended in a suitable solvent or suspension carrier, such as ethanol, pentane, diethyl ether, glucose, glycols, water, steam or other volatile or non-volatile solvents or carriers to form a solution or suspension for contacting with the smoking filler material or filter means. The smoking filler material may be contacted with solvent or carrier having the diterpene glycoside by impregnating, spraying, soaking, dipping, brushing or otherwise contacting with the resulting suspension or solution.

It is apparent to those skilled in the art that only a portion of the smoking filler material or filter means need be treated with a diterpene glycoside, since blending or other operations may be used to adjust the final or ultimate smoking composition within the effective or desired ranges of concentration of diterpene glycoside. In addition to a diterpene glycoside, other flavorings or aroma additives known in the smoking composition flavoring art may be used with a diterpene glycoside and added along with the diterpene glycoside to the smoking composition. Representative flavorings used in the smoking composition flavoring art include ethyl acetate, isoamyl acetate, propyl isobutyrate, isobutyl butyrate, ethyl butyrate, ethyl valerate, benzyl formate, menthol, limonene, cymene, pinene, linalool, geraniol, citroneilol, citral, pepperment oil, orange oil, coriander oil, lemon oil, borneol, cocoa extract, tobacco extract, licorice extract and fruit extractives.

It has also been found that leaf material of S. rebaudiana may contain one or more compounds that are not diterpene glycosides which qualify the taste of the leaf material by contributing an unsweet or unpleasant taste to the leaf material. A compound, which imparts an unsweet, undesired taste and qualifies the taste of the leaf material will hereinafter in the specifications and claims be referred to as a "taste qualifier". Examples of taste qualifiers to which this aspect of this invention pertains are found in S. rebaudiana are volatile aromatic or essential oils, tannins and flavinoids. It has been discovered that the concentration of a taste qualifier in S. rebaudiana leaf material can vary with plant variety environmental growing conditions and location of plant-growing site. The variation of concentration of a taste qualifier in S. rebaudiana leaf material can cause a variation in desirability and utility of the leaf material.

Thus, in accordance with another embodiment of this invention, a process for reducing the concentration of a taste qualifier of S. rebaudiana leaf material comprises heating the leaf material comprising the taste qualifer at a temperature in the range of about 60° C. to about 200° C. for a period of time sufficient to remove at least a portion of the taste qualifier. Since there are natural variations in the concentration of a taste qualifier in S. rebaudiana leaf material, the period of heating will vary, and an optimum heating period must be determined experimentally, considering also other factors such as depth of heated bed of leaf material, moisture content of leaf material, and the like. It has been found that the concentration of a taste qualifier in S. rebaudiana leaf material can preferably be reduced by heating the leaf material at a temperature in the range of about 90° C. to about 110° C. for a period of time sufficient to remove at least a portion of the taste qualifier. More preferably, the leaf material is contacted with a flow of a gaseous stream, such as air, nitrogen, carbon dioxide and other gases, during heating or at least during a portion of the period of time in which the leaf material is heated. More preferably, the leaf material is contacted during heating with about 1 to 60 cubic feet per minute of gaseous steam at a temperature of about 90° C. to about 110° C. for about 0.1 to 1.0 hours per kg. of leaf material.

In one variation of this embodiment, a process for reducing the concentration of a taste qualifier of S. rebaudiana leaf material comprises contacting the leaf material comprising a taste qualifier with an organic solvent having a polarity greater than hexane but less than water to form a suspension of leaf material and organic solvent. Examples of preferred organic solvents include ethyl acetate, dioxane, methylene chloride, chloroform, ethylene dichloride and tetrahydrofuran, or mixtures or combinations thereof. Preferably, the temperature of the suspension is adjusted to a temperature of about 1° C. to about 10° C. lower than the boiling point of the organic solvent to improve the efficiency of the process. The leaf material is then separated from the suspension to form a product leaf material and a solvent residue comprising a taste qualifier. The separation can be by filtration, centrifuging and by other suitable separation methods. Preferably, separation is by filtration of the leaf material from the solvent and evaporative drying of product leaf material to remove solvent from the leaf material. It has been surprisingly found that this process can be utilized to remove a taste qualifier from S. rebaudiana leaf material, without substantially or noticably altering the concentration of sweet-tasting diterpene glycosides which may be found in the leaf material.

In another variation of this embodiment, a process for reducing the concentration of a taste qualifier of S. rebaudiana leaf material comprises contacting the leaf material comprising a taste qualifier with water to form a suspension of leaf material and water. Although higher temperatures in excess of about 95° C. to 100° C. may be used, higher temperatures may cause the extraction and removal of a desired diterpene glycoside; therefore, preferably, the suspension is heated to a temperature in the range of about 25° C. to about 50° C. for about one to about twenty-four hours. The leaf material is then separated from the suspension to form a first product leaf material and a water residue comprising a taste qualifier. The separation can be by filtration, centrifuging and by other suitable separation methods. Preferably, the separation is by filtration of the leaf material from the water, followed by evaporative drying of the first product leaf material to remove water in the leaf material. This process of removing a taste qualifier of S. rebaudiana leaf material may also alter the concentration of, or remove at least a portion of, a sweet-tasting diterpene glycoside from the first product leaf material. To increase the sweetness of the first product leaf material, the first product leaf material can be contacted with a diterpene glycoside-carrier mixture formed by admixing a diterpene glycoside with a carrier. Preferred carriers include water, ethanol, methanol, or mixtures thereof. At low concentrations of a diterpene glycoside, the mixture can be a solution, and at higher concentrations of a diterpene glycoside, the mixture can be a suspension. The carrier can be removed by filtration, evaporation, or otherwise, from the first product leaf material to form a second product leaf material comprising an added diterpene glycoside. The added diterpene glycoside is a deposit or residue on or with the leaf material.

A diterpene glycoside, in its extracted or purified state, is generally a fine powder, having a particle size in the range of about 1 to 100 microns. Fine powders are difficult to handle and difficult to admix with orally consumable compositions, such as tea leaves, tobacco products, herb leaves, coffees and other orally consumable compositions. Also, generally, only a relatively small amount of a diterpene glycoside is used with an orally consumable composition when the diterpene glycoside is used as a flavor modifier or enhancer or as a sweetener. Problems can occur because a diterpene glycoside may not be uniformly mixed with an orally consumable composition or remain mixed during transportation or use of the orally consumable composition.

In accordance with another embodiment of this invention, a process for adding a diterpene glycoside to an orally consumable composition comprises admixing a diterpene glycoside with a carrier to form a diterpene glycoside-carrier mixture. Preferred carriers include water, ethanol, methanol, or mixtures thereof. The diterpene glycoside solution so formed is contacted with an orally consumable composition, and the carrier is removed from the orally consumable composition by evaporation, or otherwise, and the diterpene glycoside residues deposited with the orally consumable composition. This process is particularly useful for adding a diterpene glycoside to tea leaves or herbal plant leaves.

In accordance with still another embodiment of this invention, a liquid filter material, suitable for use with an orally consumable composition, is prepared with a diterpene glycoside. The term "liquid filter", as used herein in the specifications and claims, refers to a porous or semi-porous filter material used for preparation of an orally consumable composition such as a tea bag, a coffee filter or a filter disk. The term "filter disk" refers to a porous or semi-porous inactive article added to an orally consumable composition for the purposes of acting as a vehicle for the addition of a flavoring or sweetening composition to the orally consumable composition. A liquid filter having improved utility can comprise a diterpene glycoside. A process for preparing a liquid filter comprising a filter material and a diterpene glycoside comprises admixing a diterpene glycoside with a carrier to form a diterpene glycoside-carrier mixture; contacting the diterpene glycoside-carrier mixture with the filter material; and removing the carrier from the filter material and depositing a diterpene glycoside residue on the filter material.

The following examples are intended to further illustrate the invention without undue limitation of scope.

EXAMPLE I

Smoking Composition

A cured and shredded, commercially available domestic tobacco material, Laredo TM (Brown & Williamson Tobacco Corp., Louisville, Ky.) was sprayed with a solution of water and a mixture of diterpene glycosides comprising:

| Diterpene Glycoside | Parts by Weight |
| --- | --- |
| stevioside | 2.63 |
| rebaudioside | 87.04 |
| other diterpene glycosides | 10.33 |
| Total | 100.00 |

The water was removed from the tobacco material by drying by evaporation. The smoking tobacco material was manufactured into a cigarette.

The following concentrations of the mixture of diterpene glycoside were tested:

| | Weight of Tobacco Material | Weight of Diterpene Glycosides |
| --- | --- | --- |
| Test (a) | 5 grams | 0.20 milligrams |
| Test (b) | 5 grams | 0.75 milligrams |
| Test (c) | 5 grams | 1.50 milligrams |

-continued

| | Weight of Tobacco Material | Weight of Diterpene Glycosides |
| --- | --- | --- |
| Test (d) | 5 grams | 15.00 milligrams |

The smoking compositions (a), (b) and (c) were taste tested by smoking and compared against a control. Test smoking compositions (a) and (b) could not be distinguished from the control. Test smoking compositions (c) and (d) were found to have a different and more desirable taste.

EXAMPLE II

Smoking Composition

A Laredo TM filter comprising predominately an acetate fibrous material was injected with a solution of water and the mixture of diterpene glycosides, as described in Example I above. The treated filter material was dried by evaporation to remove the water and was reassembled to a wrapped smoking composition to form a filter cigarette.

The following concentrations of the mixture of diterpene glycosides were tested:

| | Weight of Tobacco Material | Weight of Diterpene Glycosides |
| --- | --- | --- |
| Test (a) | 5 grams | 0.75 milligrams |
| Test (b) | 5 grams | 1.50 milligrams |
| Test (c) | 5 grams | 15.00 milligrams |

EXAMPLE III

Chewing Composition

A chewing composition, having an enhanced or modified flavor, is prepared by adding a diterpene glycoside to a chewing tobacco. A source of diterpene glycoside was a leaf material from S. rebaudiana comprising a mixture of stevia diterpene glycosides:

| Stevia Diterpene Glycoside | Glycosides Per 100 Parts by Weight Stevia Leaves |
| --- | --- |
| stevioside | 6.66 |
| rebaudioside | 5.62 |
| other diterpene glycosides | 1.60 |
| Total | 13.88 |

In this example, 30 grams of a commercially available chewing tobacco (Skoal TM, United States Tobacco Co., Franklin Park, Ill.) was opened, and its volume was expanded to permit relatively even distribution of an additive. Six one-hundredths (0.06) of the above described leaf material of S. rebaudiana were combined and mixed in a beaker with the chewing tobacco.

| Component | Parts by Weight |
| --- | --- |
| chewing tobacco | 99.8 |
| leaf material | 0.2 |
| Total | 100.00 |

On taste testing against a control, the chewing composition comprising the S. rebaudiana leaf material was found to have a different or enhanced or modified taste or flavor over the control. The chewing composition having the stevia diterpene glycoside did yield a different but pleasant chew.

EXAMPLE IV

Oral Hygiene Composition

An astringent mouthwash for oral hygiene use and mouth rinsing, having a modified or enhanced flavor, is prepared by preparing the following separate groups of ingredients. The first group of ingredients:

1. One (1.0) gram of zinc sulfate is dissolved in 350 grams of distilled water at room temperature to form a zinc sulfate solution. To the zinc sulfate solution is added 0.4 grams of sodium saccharin, reagent grade, 12.5 millimeters of glycerin and 0.02 grams of a mixture of stevia diterpene glycoside:

| Diterpene Glycoside | Parts by Weight |
| --- | --- |
| stevioside | 49.5 |
| rebaudioside A | 38.6 |
| other diterpene glycosides | 11.9 |
| Total | 100.00 |

The sodium saccharin, glycerin, water and stevia diterpene glycosides are admixed with the zinc sulfate solution.

The second group of ingredients:

1. Five-tenths (0.5) gram of polysorbate 80 is dissolved in 50 milliliters of ethyl alcohol (95%) at room temperature to form a solution. To the resultant solution is added 0.25 milliliters clove oil and 1.0 milliliters cinnamon oil. The resulting solution of polysorbate 80, alcohol, clove oil and cinnamon oil is well mixed by stirring for five minutes. The second group of ingredients is admixed with the first group of ingredients, along with food coloring if desired. A control astringent mouthwash is prepared in the same manner, without the addition of the diterpene glycoside. The oral hygiene composition comprising the stevia diterpene glycoside was found to have an enhanced or modified flavor.

EXAMPLE V

Foodstuffs

A maple frosting, useful for coating of cakes, cookies and other foodstuffs and having a modified or enhanced flavor, is prepared by combining the following ingredients and admixing in a 1,000 milliliter beaker:

| Ingredients | Parts by Weight |
| --- | --- |
| confectioners sugar | 80.81 |
| butter | 6.81 |
| milk | 10.57 |
| vanilla extract | 1.17 |
| maple extract | 0.59 |
| a mixture of diterpene glycoside | 0.05 |
| Total | 100.00 |

The mixture of stevia diterpene glycosides comprise the following composition: stevioside 49.5 parts by weight, rebaudioside A 38.6 parts by weight.

EXAMPLE VI

Foodstuff

A soup, having an enhanced or modified, is prepared by the following process:

1. Ground beef is heated in the presence of onions and garlic in a beaker on a hotplate (medium temperature setting), with mixing until the beef is fully cooked. Excess fats and other liquids are drained from the heated mixture. The heated mixture of ground beef, onions and garlic is then admixed with water, table salt, pepper, sage, tomatoes, celery, carrots, cabbage, beef broth, beef boullion cubes, oregano leaves and stevia leaves comprising a diterpene glycoside.

2. A leaf material from *S. rebaudiana* was used comprising the following mixture of diterpene glycosides:

| Diterpene Glycoside | Parts by Weight |
| --- | --- |
| stevioside | 6.66 |
| rebaudioside A | 5.62 |
| other diterpene glycosides | 1.60 |
| Total | 13.88 |

The resulting mixture comprising the diterpene glycoside is heated until boiling and boiled for about one minute and then cooked at a reduced amount of heat by simmering for approximately 20 minutes. To the mixture is added uncooked rice, and the resulting mixture with rice is cooked at a reduced heat by simmering for approximately 15 minutes.

The resulting foodstuff was tasted and expectorated. The resulting mixture has an enhanced or modified taste and an enhanced aroma and texture.

EXAMPLE VII

The diterpene glycosides stevioside, steviolbioside, rebaudioside A and rebaudioside B (abbreviated as SS, SB, RA and RB, respectively) were tested to evaluate their respective enhancement or modification propensites. Solution samples of approximately 25 milliliters of a strawberry sample (5% strawberry extract in water), vanilla sample (5% vanilla extract in water), cinnamon apple herbal tea (Lipton, Thomas J. Lipton, Inc., Englewood Cliffs, N.J.), orange and spice tea (Lipton), and a pekoe tea (Lipton orange pekoe and pekoe cut black tea) were presented to each subject.

The comparison was done on an equal weights basis, on an equilmolar concentration basis and on an isosweet concentration as follows:

| COMPARISON | CONCENTRATION PERCENT BY WEIGHT | | | |
| --- | --- | --- | --- | --- |
| | SS | SB | RA | RB |
| Equal Weights | 0.004 | 0.004 | 0.004 | 0.004 |
| Equimolar Concentration | 0.004 | 0.003 | 0.005 | 0.004 |
| Isosweet Concentration | 0.006 | 0.014 | 0.004 | 0.0045 |

Procedures were taken to ensure testing uniformity. A solution sample size of approximately 25 milliliters was given to each of about four to six test subjects for a comparison basis. Sample testing was conducted with a single subject present and no interference from other testing subjects. Each subject was asked to orally consume without swallowing a test solution, hold, and expectorate after holding in the subject's mouth for a sufficient time to evaluate flavor characteristics. Each subject was asked to evaluate and compare a test sample containing a diterpene glycoside to a control containing the same flavoring solution or tea, or the like, but containing no diterpene glycoside. In separate experiments, each subject was asked to rank four samples (flavored sample containing RA, flavored sample containing RB, flavored sample containing SS and flavored sample containing SB); however, for the isosweet strawberry sample, the four samples were strawberry control, strawberry solution with SS, strawberry solution with RA and strawberry solution with RB, since SB was not sufficiently soluble to prepare an isosweet sample. The test samples were presented to the subjects in a random manner to eliminate preferences which might result from presentation in a specific order. The subjects were not informed of the contents of any of the solutions which were tested.

Strawberry and vanilla samples were prepared at room temperature (approximately 25° C.), were refrigerated and were served at approximately 18°–20° C. Teas were prepared with boiling deionized water and cooled to aproximately 45° C. prior to serving.

McCormick Imitation Strawberry Extract and McCormick Pure Vanilla Extract (McCormick & Co., Inc., Baltimore, Md.) were dissolved in deionized water at room temperature to prepare the strawberry and pure vanilla extracts, respectively. A concentrated aqueous solution of the appropriate diterpene glycoside was added with mixing to the solution containing the flavor extractives, and the final weight of the solution was adjusted by the addition of deionized water. The concentrated diterpene glycoside (DTG) solutions were SB at 0.00625% (weight/weight), RA, RB and SS at 0.025% (weight/weight). The finished flavor mixtures comprising the diterpene glycoside solutions were refrigerated prior to taste testing and contained the following weights of flavor and diterpene glycoside.

| COMPARISON | WEIGHT OF INGREDIENT (mg/200 gm of test solution) | | | | |
|---|---|---|---|---|---|
| | SS | SB | RA | RB | FLAVOR |
| Equal Weights DTG's | 8.0 | 8.0 | 8.0 | 8.0 | 10,000.00 |
| Equimolar Concentrations DTG's | 8.0 | 6.0 | 10.0 | 8.0 | 10,000.00 |
| Isosweet Concentrations DTG's | 12.0 | 28.0 | 8.0 | 9.0 | 10,000.00 |

For the teas, a tea bag was placed in a beaker, and the appropriate quantity of a diterpene glycoside solution and boiling deionized water were added to a total weight of 200 grams. The beaker was placed on a hot plate, and the solution was heated for five minutes. After cooling, the final weight of tea was approximately 180 grams, and the diterpene glycosides were as listed in the table above.

All samples were to be ranked by the test subject at a single sitting. The time between evaluating samples were approximately one minute. No more than two experiments were conducted with a single subject in a single day to prevent taste fatigue. In all of the taste tests, there was no reported difference between the control and a sample containing one of the diterpene glycosides, with respect to the aroma or texture of the control versus the sample containing the diterpene glycoside. The results are as follows:

1. Strawberry Sample.

In the equal weight test, all of the samples containing a diterpene glycoside were preferred by the test panel over the control. There was no preference by a test subject for one diterpene glycoside over another.

In the equimolar test, all of the samples containing a diterpene glycoside were preferred over the control, and there was no preference for one diterpene glycoside over another.

In the isosweet test, SB was not tested because the solubility was not sufficiently high to obtain the appropriate concentration. RA and RB were preferred over SS, and most testers reported an off-taste typically observed with SS. SS, RA and RB were all preferred over the control.

In a special equimolar versus isosweet test of RA (0.005% versus 0.004%), the higher concentration of RA was preferred over the lower concentration, and the higher concentration was reported to reduce sharpness or tartness of the sample.

2. Vanilla Sample.

In the equimolar testing, all of the samples containing a diterpene glycoside were preferred over the control, and there was no preference for one diterpene glycoside over another.

In a special equimolar versus isosweet test of RA (0.005% versus 0.004%), the higher concentration of RA was preferred over the lower concentration of RA.

3. Cinnamon Apple Herbal Tea.

In an equimolar test, all of the diterpene glycosides were preferred over the control containing no diterpene glycosides. RA was preferred over other diterpene glycosides, followed in order of preference by RB, SS and SB.

4. Orange and Spice Tea.

In the equimolar test, all of the samples containing a diterpene glycoside were preferred by the test panel over the control. RA was preferred, followed in order of preference by RB, SS and SB.

5. Pekoe Tea.

In the equimolar test, all of the test subjects reported that the tea containing SS and RA were sweet, while exactly 50% of the test panel reported that the tea containing RB was sweet. None of the test panel reported an enhancement of the tea taste. The test was repeated with a different brand of tea —Twining (R. Twining & Co., Ltd. Greensboro, N.C.)—and similar results were obtained.

EXAMPLE VIII

Intact, air-dried S. rebaudiana leaves (50 gm) were thinly spread over the bottom of an aluminum foil-linked tray and placed in a forced-air laboratory oven at 100° C. for 12 hours. The door of the oven was opened every 4 hours for 10 minutes to allow the volatile material from the leaves to diffuse out of the oven. Upon taste testing against a control, the leaves treated in this manner had very little of the "plant taste" associated with the S. rebaudiana control. The treated product leaves still retained a sweet taste, evidencing the presence of sweet diterprene glycosides.

EXAMPLE IX

Intact, air-dried S. rebaudiana leaves (30 gm) were placed in a 500 ml Erlenmeyer flask and 300 ml reagent grade organic solvent, ethyl acetate (Fisher Scientific) were added to form a suspension of leaf material and organic solvent. The flask containing the suspension of leaves and solvent was placed in a water bath at 40° C. and heated for 5 hours. After this time, the suspension was filtered in vacuo through Whatman number 1 filter paper in a Büchner funnel to remove solvent from the leaf material. The leaves were then spread in an aluminum pan lined with aluminum foil and were allowed to air dry for 24 hours to remove trace amounts or residues of ethyl acetate. Upon taste testing against a control, the dried product leaves had virtually none of the "plant taste" associated with the control *S. rebaudiana* leaves. The product leaf material still retained a sweet taste, evidencing the presence of sweet diterpene glycosides.

EXAMPLE X

Intact, air-dried leaves of *S. rebaudiana* (60 gm) were placed in a 1000 ml Erlenmeyer flask and 500 ml of distilled water were added to form a suspension of water and leaf material. The flask containing the suspension of leaves and water was placed in a water bath at 40° C. and heated for 1 hour. After this time, an additional 500 ml of distilled water was added and the leaves were filtered in vacuo through Whatman number 1 filter paper in a Büchner funnel. The extracted leaves were thinly spread on aluminum foil to air dry. After drying, the leaves were added to a solution of 200 ml of distilled water containing 6.0 gm of dissolved purified diterpene glycosides (total diterpene glycosides of *S. rebaudiana* after extraction and removal of plant coloring materials and other non-diterpene glycoside materials). The leaves were mixed with the solution to insure uniform wetting. The moistened leaves were thinly spread on aluminum foil to air dry and remove excess water. Upon taste testing against a control, leaves prepared in accordance with this Example had lost much of the "plant taste" associated with control *S. rebaudiana* leaves. The product leaf material contained both non-extracted diterpene glycoside materials originally present in the plant leaves and contained the added, impregnated diterpene glycoside materials.

EXAMPLE XI

Intact, air-dried leaves of *S. rebaudiana* (60 gm) were placed in a 1000 ml Erlenmeyer flask and 500 ml of distilled water were added to form a suspension of water and leaf material. The flask containing the suspension of leaves and water was incubated at room temperature (approximately 25° C.) for 3 hours. After this time, an additional 500 ml of distilled water was added and the leaves were filtered in vacuo through Whatman number 1 filter paper in a Büchner funnel. The leaves were then thinly spread on aluminum foil to air dry. Upon taste testing against a control, the product leaf material had lost much of the "plant taste" associated with the control *S. rebaudiana* leaves. The product leaf material retained a lesser sweet taste, indicating presence of some, but not all, of the original diterpene glycoside contained in the untreated leaf material.

EXAMPLE XII

A purified diterpene glycoside extractive obtained from *S. rebaudiana* (90 mg) was dissolved in 10 ml of distilled water to form a diterpene glycoside solution. Twenty Whatman number 1 filter discs, 7.0 mm in diameter, were individually touched to the surface of the diterpene glycoside solution such that the solution was allowed to travel up the filter discs by capillary action. Each disc was air dried. The staples were removed from twenty Lipton (trademark of Thomas J. Lipton, Inc., Englewood Cliffs, N.J.) Orange and Space tea bags, and the bags were opened. One impregnated disc was added to each tea bag, and the bags were stapled closed. Since each filter disc absorbed 0.01 ml of solution, and since each tea bag contained 2.0 gm of tea, the final concentration of diterpene glycoside in the tea was 0.0045% (weight diterpene glycoside per weight tea leaves). Tea was then prepared from the treated tea bags in the usual manner by contacting with boiled water. The resulting tea was tasted and contained a pleasant taste.

EXAMPLE XIII

A purified diterpene glycoside extractive obtained from *S. rebaudiana* (90 gm) was dissolved in 10 ml of distilled water to form a diterpene glycoside solution. One drop (0.01 ml) of this solution was then dropped on each of twenty Lipton Orange and Spice tea bags just above the level of the tea leaves, such that the water would not cause the tea bag to be discolored by the tea leaves. Each bag was then air dried. The final diterpene glycoside material concentration in the tea was 0.0045% (weight diterpene glycoside per weight per leaves). Tea was then prepared in the usual manner by contacting with boiled water. The resulting tea was tasted and contained a pleasant taste.

Reasonable variations and modifications, which will become apparent to those skilled in the art, can be made in this invention without departing from the spirit and scope thereof.

What is claimed is:

1. An orally consumable composition having a modified or enhanced flavor comprising an effective amount of a diterpene glycoside, wherein said amount of diterpene glycoside is less than the sweetness threshold level of the diterpene glycoside in the orally consumable composition, said diterpene glycoside having the structure:

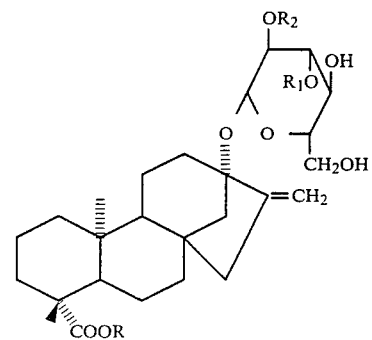

wherein R, $R_1$ and $R_2$ are selected from the group consisting of H, glucose, rhamnose and beta-sophorose.

2. An orally consumable composition of claim 1 wherein the diterpene glycoside is selected from the group consisting of steviolbioside (R=$R_1$=H; $R_2$=glucose); stevioside (R=$R_2$=glucose; $R_1$=H); rebaudioside A (R=$R_1$=$R_2$=glucose); rebaudioside B (R=H; $R_1$=$R_2$=glucose); rebaudioside C (R=$R_1$=glucose; $R_2$=rhamnose); rebaudioside D (R=beta-sophorose; $R_1$=$R_2$=glucose); rebaudioside E (R=beta-sophorose; $R_1$=H; $R_2$=glucose); dulcoside A (R=glucose; $R_1$=H; $R_2$=rhamnose); steviolmonoside (R=$R_1$=$R_2$=H); and rubusoside (R=glucose; $R_1$=$R_2$=H); and derivatives of such compounds.

3. An orally consumable composition of claim 1 wherein the diterpene glycoside is a component of a leaf material of *Stevia rebaudiana*.

4. An orally consumable composition of claim 1 comprising 0.001 to 0.03 parts by weight diterpene glycoside to 100 parts by weight of orally consumable composition.

5. A process for modifying or enhancing the flavor of an orally consumable composition comprising the step of adding thereto an effective amount of a diterpene glycoside, wherein said amount of diterpene glycoside is less than the sweetness threshold level of the diterpene glycoside in the orally consumable composition, said diterpene glycoside having the structure:

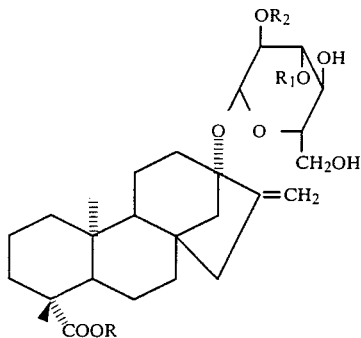

wherein R, $R_1$ and $R_2$ are selected from the group consisting of H, glucose, rhamnose and beta-sophorose.

6. A process in accordance with claim 5 wherein the diterpene glycoside is selected from the group consisting of steviolbioside ($R=R_1=H$; $R_2=$glucose); stevioside ($R=R_2=$glucose; $R_1=H$); rebaudioside A ($R=R_1=R_2=$glucose); rebaudioside B ($R=H$; $R_1=R_2=$glucose); rebaudioside C ($R=R_1=$glucose; $R_2=$rhamnose); rebaudioside D ($R=$beta-sophorose; $R_1=R_2=$glucose); rebaudioside E ($R=$beta-sophorose; $R_1=H$; $R_2=$glucose); dulcoside A ($R=$glucose; $R_1=H$; $R_2=$rhamnose); steviolmonoside ($R=R_1=R_2=H$); and rubusoside ($R=$glucose; $R_1=R_2=H$); and derivatives of such compounds.

7. A process in accordance with claim 5 wherein the diterpene glycoside is a component of a leaf material of *Stevia rebaudiana*.

8. A process in accordance with claim 5 wherein 0.001 to 0.03 parts by weight diterpene glycoside are added to 100 parts by weight of orally consumable composition.

9. A smoking composition having a modified or enhanced flavor comprising a smoking filler material selected from the group consisting of tobacco, reconstituted tobacco, non-tobacco smoking substitute, and mixtures thereof, and an effective amount of a diterpene glycoside having the structure:

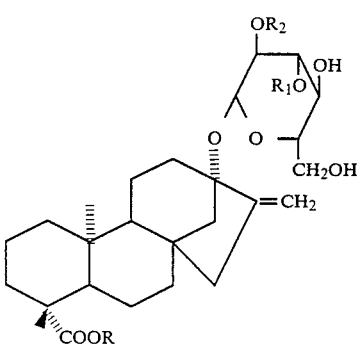

wherein R, $R_1$ and $R_2$ are selected from the group consisting of H, glucose, rhamnose or beta-sophorose;

10. A smoking composition of claim 9 comprising 0.003 parts by weight to about 0.30 parts by weight of a diterpene glycoside to 100 parts by weight of smoking filler material.

11. A smoking composition in accordance with claim 9 comprising a filter means comprising a diterpene glycoside.

12. A smoking composition in accordance with claim 11 wherein the smoking composition is a filter cigarette.

13. A process for modifying or enhancing the flavor of a smoking composition comprising a smoking filler material selected from the group consisting of tobacco, reconstituted tobacco, tobacco substitute, and a mixture thereof, comprising the step of adding an effective amount of a diterpene glycoside having the structure:

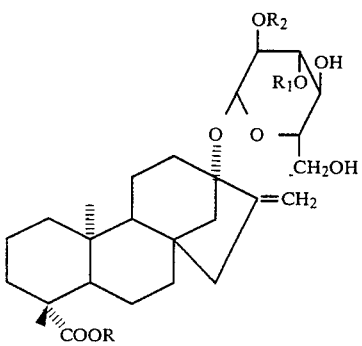

wherein R, $R_1$ and $R_2$ are selected from the group consisting of H, glucose, rhamnose or beta-sophorose.

14. A process in accordance with claim 13 wherein 0.003 to 0.30 parts by weight of diterpene glycoside is added per 100 parts by weight to a smoking filler material.

15. A process in accordance with claim 13 wherein a diterpene glycoside is added to the smoking filler material.

16. A process in accordance with claim 15 comprising:
   a. dissolving a diterpene glycoside in a suitable solvent to form a solution of solvent and diterpene glycoside;
   b. contacting the smoking filler material with the solution; and
   c. removing excess solvent;

17. A process in accordance with claim 15 comprising:
   a. suspending the diterpene glycoside in a suitable suspension carrier to form a suspension;
   b. contacting the smoking filler material with the suspension; and
   c. removing the excess suspension carrier;

18. A process for reducing the concentration of a taste qualifier of leaf material of *Stevia rebaudiana* comprising a taste qualifer, comprising heating the leaf material at a temperature in the range of about 60° C. to about 200° C. for a period of time sufficient to vaporize at least a portion of the taste qualifier.

19. A process in accordance with claim 18, wherein the leaf material is contacted, during at least a portion of the period of time in which the *Stevia rebaudiana* leaf material is heated, with a gaseous stream.

20. A process in accordance with claim 19, wherein the gaseous stream is selected from the group consisting of air, steam, nitrogen and carbon dioxide.

21. A process for reducing the concentration of a taste qualifier of leaf material of *Stevia rebaudiana* comprising:
   a. contacting the leaf material comprising a taste qualifier with an organic solvent, having a polarity greater than hexane but less than water, to form a suspension of leaf material and organic solvent; and
   b. separating the leaf material from the suspension of leaf material and organic solvent to form a product leaf material and a solvent residue comprising a taste qualifier.

22. A process in accordance with claim 21, wherein the organic solvent is selected from the group consisting of ethyl acetate, dioxane, methylene chloride, chloroform, ethylene dichloride and tetrahydrofuran.

23. A process in accordance with claim 21, wherein the separation is by filtration of organic solvent from the suspension of leaf material and organic solvent and drying of the product leaf material to remove organic solvent from the leaf material.

24. A process for removing the concentration of a taste qualifier of leaf material of *Stevia rebaudiana* comprising a taste qualifier comprising:
   a. contacting the leaf material comprising a taste qualifier with water to form a suspension of leaf material and water;
   b. separating the leaf material from the water to form a first product leaf material and a water residue comprising a taste qualifier;
   c. admixing a diterpene glycoside with a carrier to form a diterpene glycoside-carrier mixture;
   d. contacting the diterpene glycoside-carrier mixture with the first product leaf material; and
   e. removing the carrier from the first product leaf material to form a second product leaf material comprising an added diterpene glycoside.

25. A process for adding a diterpene glycoside to an orally consumable composition comprising:
   a. admixing a diterpene glycoside with a carrier to form a diterpene glycoside-carrier mixture;
   b. contacting the diterpene glycoside-carrier mixture with the orally consumable composition; and
   c. removing the carrier and depositing a diterpene glycoside residue with the orally consumable composition.

26. A process in accordance with claim 24 or 25, wherein is selected from the group consisting of water, ethanol and methanol.

27. An orally consumable composition, in accordance with claim 1, comprising a foodstuff.

28. An orally consumable composition, in accordance with claim 1, comprising a medicinal composition.

29. An orally consumable composition in accordance with claim 1, comprising an oral hygiene composition.

30. An orally consumable composition, in accordance with claim 1, comprising a chewing composition.

31. An orally consumable composition, in accordance with claim 1, comprising a smoking composition.

32. A process, in accordance with claim 8, wherein the orally consumable composition is a foodstuff.

33. A process, in accordance with claim 8, wherein the orally consumable composition is a medicinal composition.

34. A process, in accordance with claim 8, wherein the orally consumable composition is an oral hygiene composition.

35. A process, in accordance with claim 8, wherein the orally consumable composition is a chewing composition.

36. A process, in accordance with claim 8, wherein the orally consumable composition is a smoking composition.

* * * * *